Nov. 28, 1961 W. I. CARLSON 3,010,498
BEAN SNIPPER

Filed March 13, 1958 4 Sheets-Sheet 2

INVENTOR.
Wyman I. Carlson
BY
Popp and Sommer
Attorneys.

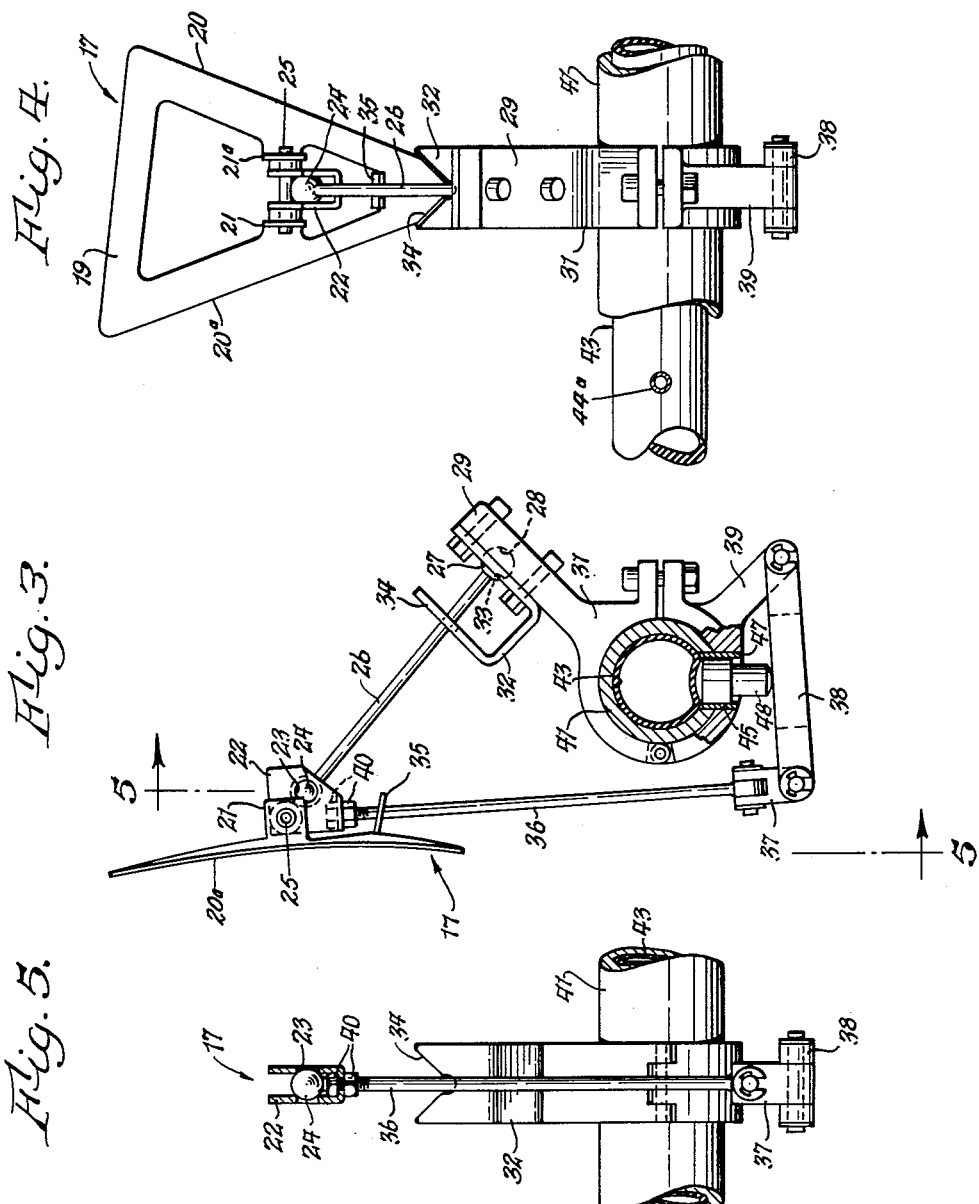

Nov. 28, 1961 W. I. CARLSON 3,010,498
BEAN SNIPPER
Filed March 13, 1958 4 Sheets-Sheet 4
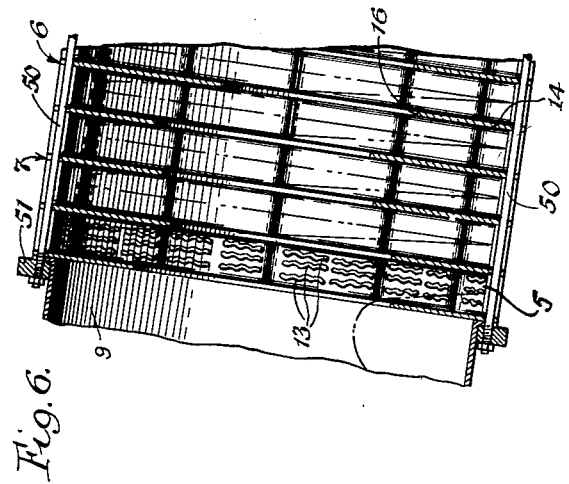
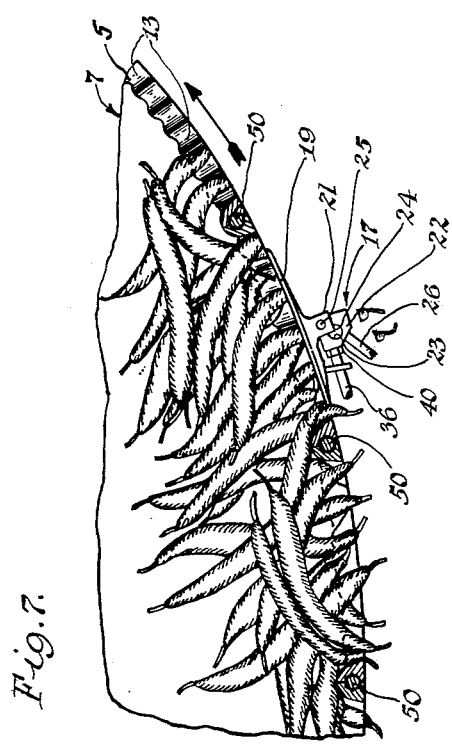
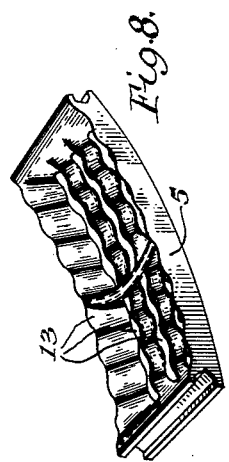
INVENTOR.
ATTORNEYS

# 3,010,498
BEAN SNIPPER
Wyman I. Carlson, Lewiston, N.Y., assignor to Chisholm-Ryder Company, Inc., Niagara Falls, N.Y., a corporation of New York
Filed Mar. 13, 1958, Ser. No. 721,271
7 Claims. (Cl. 146—86)

This invention relates to food processing machinery, and more particularly to an improvement in a bean snipper.

The patent to J. R. Urschel, 2,114,730, dated April 19, 1938, discloses a string bean snipper which uses a sloped cylindrical drum having perforations in the form of curved slots on the periphery, and a plurality of knife blades resiliently arranged against the outside of the drum. As the drum is rotated, the end of the beans therein will fall or extend through the slots and be cut off by the knife blades.

The present invention represents an improvement in the bean snipper disclosed in said patent, the principal improvement being in the form and arrangement of the knife blades. More specifically, the knife blades in the bean snipper of the present invention are arranged so that the contact pressure of all the blades upon the drum may be made uniform, and in addition, the contact pressure of all of the blades may be easily and simultaneously adjusted to provide optimum conditions for cutting the particular beans being processed. In addition, the knife blades in the bean snipper of the present invention are maintained by a linkage that permits each blade to be raised clear of any foreign object projecting from the cylinder drum and to be automatically reset to proper contact pressure after the foreign object has cleared the cylindrical drum.

In common with said Urschel Patent 2,114,730, central objects of my invention are to provide such a device wherein a moving carrier is provided with openings in the walls shaped to permit the maximum number of bean ends to project therethrough so that the projecting ends can be snipped off in any desired manner; to provide a type of opening in the wall of the bean carrier comprising a substantially zig zag or wavy shaped opening of uniform cross sectional dimension, whereby the maximum number of bean ends can project through the walls of the carrier, while at the same time precluding the possibility of the sides of the beans projecting through the slots and thereby consequently preventing the sides of the beans being damaged or cut; to provide a peculiar type of bean end opening which will permit the projection of the maximum number of bean ends into cutting position while precluding the possibility of cutting the sides of the beans; to provide a type of bean projecting opening of wavy, uniform cross section in combination with a stationary knife disposed in the path of the moving projecting bean end, and wherein the knife is disposed diagonally in the path of movement of the bean to effect a slicing action thereon; to provide such a knife which is light in weight and which is resiliently pressed against the traveling wall of the bean carrier so that in the event of a nail or other hard object coming into contact with the knife, the knife will be permitted to retreat from the cylinder with the minimum of effort and with the minimum of jarring injury to the cooperative cutting members; to provide a rotating drum having means for feeding a mass of beans in a plane at right angles to the axis of rotation of the bean feeding drum, and wherein a plurality of knives are disposed in successive spaced apart relation with respect to the path of movement of the beans, whereby as the beans travel in such circular path and are constantly shifting in position, bean ends not presented to the first knife of the series, due to their constantly shifting positions, as they move, will have the opportunity to be presented to successive knives of the series; to provide a bean containing magazine or carrier or drum, preferably of the rotatable type, disposed at an inclination to the horizontal to provide a downward tilt from the feeding-in end of the drum to the discharge end of the drum, and wherein the drum has its circumferential or peripheral walls formed with bean projecting openings provided along its interior walls with a series of spaced apart collars or circular baffles forming therebetween circular bean pockets and wherein the central openings of these collars, disks or baffles communicate, and wherein the inner edges thereof are in non-registering relation, by which construction, as the cylinder rotates, a mass of beans in any one pocket tends to wedge between the opposed walls of the baffles forming the pocket, and whereby the beans are carried substantially upwardly in a circular path and during such movement the individual beans turn and move to present new ends to the openings for projection therethrough, and wherein by means of such bodily upward movement of the mass of beans, a certain percentage of the same, on reaching the upper portions of the drum will drop or fall by gravity, and due to the downward inclination of the drum will fall into the next forward bean pocket, in which a separate mass of beans is likewise being carried upwardly in an arcuate path and a portion of which are likewise falling into the next forward pocket, where in said successive pocket the beans will, in a similar manner, be carried upwardly and be projected by gravity into the next succeeding pocket, by which manner the beans are fed through the machine, and as they are so fed will have their ends snipped off; to provide bean carrying pockets of the foregoing character wherein a positive means, such as a spiral pocket or positive bean feeders are eliminated for feeding the beans longitudinally through the machine to provide bean feeding pockets and bean cutting pockets of the foregoing character which will permit the snipped beans to move through the compartments more quickly than the unsniped beans, whereby the unsnipped beans will remain in any particular pocket for a longer period of time and hence will have greater opportunity to have their ends snipped; to provide bean snipping pockets of the foregoing character which will prevent the passage of unsnipped beans directly across the edge surfaces of the baffles and thus be discharged from the machine without having their ends snipped; to provide a feeding construction for bean snipping machines, whereby the beans will progress through the machine at a substantially uniform rate of progress; to provide a construction of the foregoing character wherein the tilt or slope of the axis of the drum may be adjusted to regulate the feed of the beans through the machine; and to provide a bean feeding arrangement for bean snipping machines having rotatable bean carrying drums wherein shorter drums may be used as compared with the older type of machines, and wherein the shorter beans will move through the drum more rapidly than the longer beans, due to the difficulty of the longer beans falling downwardly into the next forwardly disposed pocket.

A specific object of this invention is to provide a bean snipper wherein the contact pressure of a plurality of knife blades against the periphery of a perforated cylindrical drum may be made uniform.

Another specific object of this invention is to provide a bean snipper wherein the contact pressure of all knife blades used thereon may be easily and simultaneously adjusted to effect optimum conditions for cutting the particular beans being processed.

A further specific object is to provide a bean snipper wherein the knife blades used thereon are maintained by a linkage that permits each blade to be raised clear of any foreign object projecting from a perforated cylindrical drum against which the blades are held, and to automatically reset the blade to proper contact pressure after the foreign object has cleared the cylindrical drum.

These and furer specific objects and features of the invention will become more apparent from the following description and accompanying drawings wherein:

FIG. 3 is an enlarged side view of a knife blade assembly used in the bean snipper of FIG. 1, certain parts of the supporting pipe and actuating mechanism being shown in section;

FIG. 4 is a front elevation view of same; and

FIG. 5 is a view generally as seen from line 5—5 in FIG. 3;

FIG. 6 is a fragmentary vertical longitudinal sectional view through the feed end of the drum through which the beans pass;

FIG. 7 is an enlarged fragmentary vertical section through the bottom of the drum through which the beans pass and showing the manner in which the beans are arranged therein and snipped by the cutting knives;

FIG. 8 is a detail, perspective view of one of the segmental blocks which make up the drum.

Figure 1:
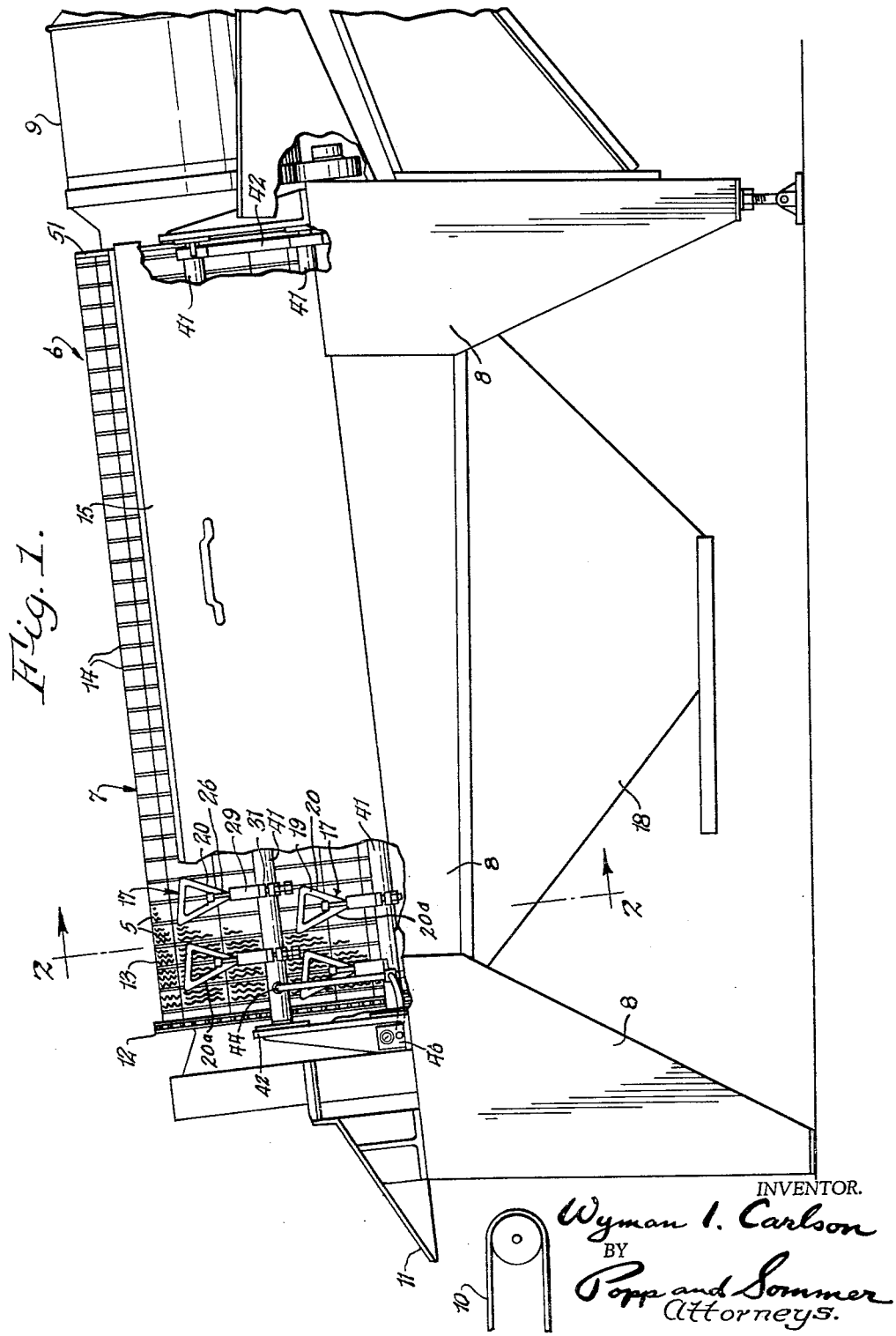
FIG. 1 is a side elevational view, with parts broken away, of a bean snipper machine incorporating an embodiment of the invention.

In general, in common with the said Urschel Patent 2,114,730 the bean snipping machine comprises in its preferred form a rotating drum which is tilted at an angle to the horizontal, the in-feeding end of the drum being higher than the discharge end. Within the drum is disposed a series of spaced apart collars, the outer edges of which are united to the inner wall of the drum and the inner circular edges of which provide an opening centrally of the longitudinal axis of the machine drum, and wherein the inner edges of the collars are out of registration, thereby providing a staggered arrangement of spaced apart circular baffles, forming therebetween bean holding and bean feeding pockets. The peripheral walls of the drum forming the curvilinear portions of these pockets are provided with bean snipping openings which are of peculiar shape, being substantially zig zag or wavy in shape, and wherein the openings are of uniform width or cross section. By providing the wavy shape, any possibility of a bean lying flat-wise or longitudinally of the opening with the side of the bean sticking therethrough sufficiently to be cut, is eliminated, and by making the cross section of the wavy shaped opening uniform, the maximum number of bean ends may project through the openings or, in short, there is no part of the opening through which a bean end may not project and there is no part of the opening through which the side of the bean may project. In conjunction with these openings, and arranged within the path of travel of the bean ends projecting therethrough, I provide one or more, and preferably a series of stationary knives which are adapted to lie flat against the traveling surface of the drum and preferably at a diagonal angle thereto, so that slicing action is provided, so that as the beams are wedgingly carried between the opposed baffle walls of the pockets, they will be moved upwardly past the series of spaced apart knives and during this movement may shift in the pockets to present new ends to the bean openings and, in addition, by means of the wedging action of the mass of beans in the pocket, the beans as a whole and as a mass will be carried upwardly by the rotating drum so that a percentage of the beans, on reaching the upper portion of the drum, will drop vertically downwardly and, due to the tilt of the drum, a percentage will fall into the next feed pocket where the action will be repeated, and thus a certain percentage of the beans is constantly being fed through the drum to the discharge end. By regulating the tilt of the drum the rate of passage of the beans through the machine is controlled, and by staggering the inner edges of the baffles, the direct passage of the beans across the inner edges of the baffles is precluded. By reason of the general construction, the snipped beans may travel faster through the machine since they are shorter and will be less impeded by the baffles than the unsnipped beans, and whereby the unsnipped beans will be retained in the pockets a longer time and will have greater chance to be snipped. In addition, I form the stationary knives of relatively light construction and have resiliently mounted them so that they press resiliently against the outer traveling surface of the drum, by which action a quicker retreat of the knives from the drum is permitted when nails or other hard objects come in contact with the knives, and whereby the bean cutting edges are less likely to be damaged. By the provision of a machine of the foregoing construction, I am able to use knives which will produce a slicing action but which knives may retreat with speed should they come in contact with nails or other hard objects.

Figure 2:
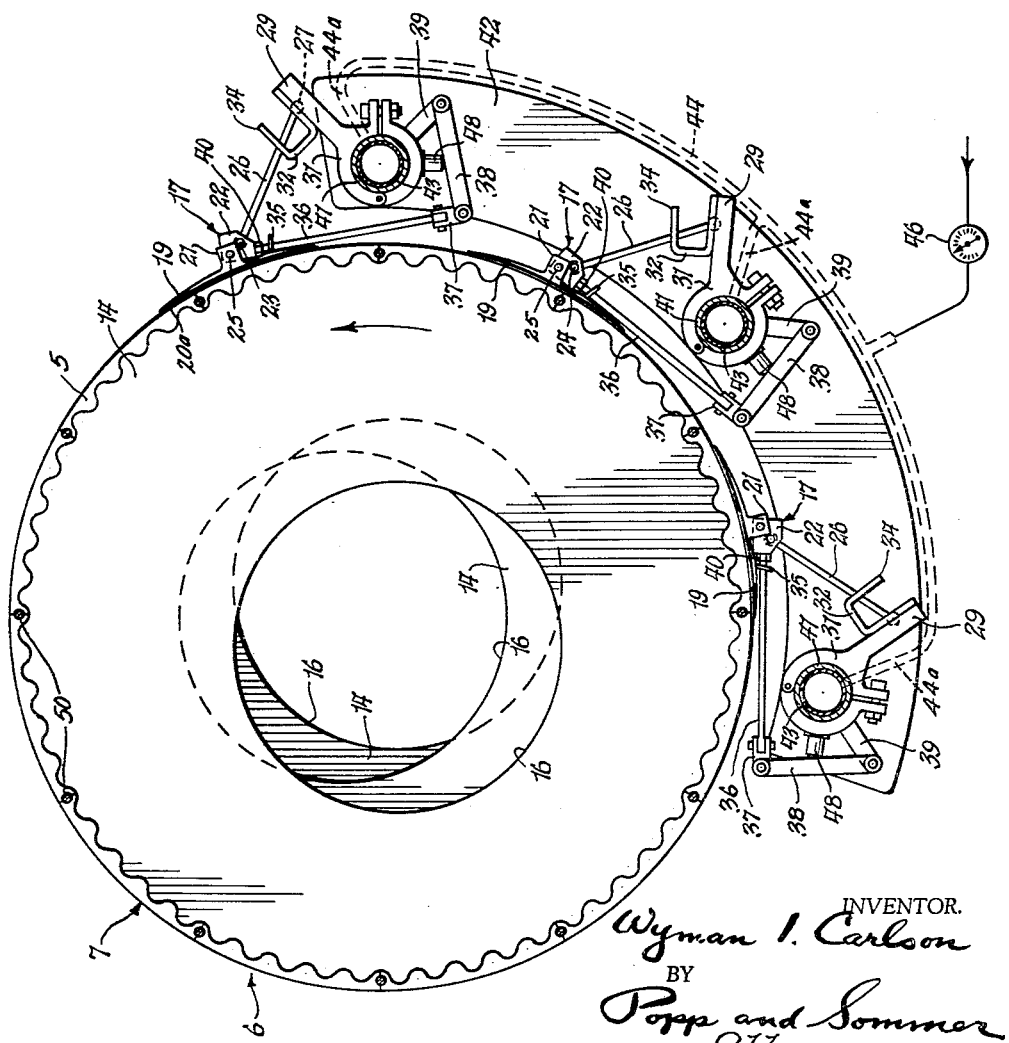
FIG. 2 is an enlarged section view as seen from line 2—2 in FIG. 1.

Referring now the drawings the numeral 6 identifies a bean snipper which includes a cylindrical drum 7 rotatably supported at an angle to the horizontal upon a frame or stand 8, a bean feed-in housing or hopper 9 at one end, a bean feed-out trough or chute 11 at the other end arranged to dispose the snipped beans upon a conveyor belt 10, and a motor driven chain drive 12 arranged for rotation of the drum 7. Shields 15, coextensive with the drum 7, may be arranged along each side thereof. The drum has a plurality of segmental plates or blocks 5 of rectangular form in plan each having wavy grooves or slots 13 formed in its peripheral surface, said slots being generally arranged in groups of three and said plates or blocks being separated by a plurality of baffle plates or discs 14 having off-center holes 16 arranged in staggered manner, as best seen in FIG. 2. As a supply of string beans is admitted to the rotating drum at the feed-in hopper 9, they are moved along within the drum 7, and the ends are caused to enter the slots 13 in random manner and project therefrom, as shown in FIG. 7. A plurality of knife blade assemblies 17 maintained in sliding contact with the outer surface of the drum 7, cut off the ends of the beans, which ends fall into a hopper 18 held by the frame or stand 8, while the cut beans pass out of the drum by way of the feed-out trough 11.

Each knife blade assembly 17 has a head 19 which is triangular in form and has two cutting edges 20, 20a angularly disposed and arranged for simultaneously passing over a plurality of slots 13 as the drum rotates. Each knife blade head 19 has a pair of ears 21, 21a which are adapted for pivotally affixing the knife blade to a bracket 22 by means of a pin 25. The bracket 22 is generally U-shaped and is provided with a pair of oppositely disposed holes 23 for receipt of a ball 24 affixed on one end of a rod or strut 26, forming one part of a linkage system, the other end of the rod having a ball 27 that seats in a semi-spherical recess 28 formed in the arm 29 of a clamp or bracket 31. A keeper plate 32, having a hole 33, is arranged to hold the ball 27 rotatable within the recess 28. The keeper plate 32 is also provided with a V-shaped end 34 which is engaged by the rod 26, whereby it is allowed limited pivotal movement about the lower end thereof, i.e., ball 27.

A rod or strut 36, forming another part of the linkage system, is adjustably affixed to the bracket 22 at the upper end by holding nuts 40, and is pivotally connected at its lower end to a universal joint piece 37. A guide means 35 is formed integral with the knife blade head 19, which guide means engages the rod 36, so that rotation of the blade head relative to the rod 36 is further restricted. The piece 37 is pivotally connected to a link 38, the other end of the link being connected to an arm 39 of the bracket 31. As best seen in FIG. 3, the bracket 31 is split and is adapted to be clamped upon a pipe 41.

A group of three pipes 41 are arranged along the outside of the drum parallel with the axis of rotation of the drum, and are arcuately maintained in end brackets 42, as best seen in FIG. 2. Each pipe 41 has approximately eleven knife blade assemblies 17 thereupon, the blade assemblies on one pipe 41 being in staggered relation to the blade assemblies of an adjacent pipe. Within each pipe 41 is an expansible tube 43, the tubes of each pipe being connected to a branch 44a of pipe or hose means 44 to a source of pressure fluid, such as compressed air, whereby a given pressure as indicated by a pressure gage 46, may be simultaneously maintained in the tubes 43 of the several pipes. A plurality of holes 47, formed in each pipe 41, as well as in each blade assembly bracket 31, are arranged to receive a bushing 45 which forms a cylinder. Slidably positioned in each bushing or cylinder 45, is a piston 48 the head end of which is in engagement with the exterior of the tube 43, while the opposite end engages the link 38. The ends of the piston 48 may be rounded as shown. Obviously, outward movement of the piston 48 will tend to cause counterclockwise rotation (FIG. 3) of a knife blade assembly 17, while inward movement thereof will tend to cause clockwise rotation. Also, the pressure of each blade head 19 upon the surface of the drum may be adjusted by the holding nuts 40, so that a uniform pressure of all knife blade heads, may be realized.

The construction of the drum 7 is shown in detail in FIG. 6 from which it will be noted that the baffle plates 14 are severally in alternation with circular rows of the segmental blocks 5 and the plates and rows are held in assembled relation by tie rods 50 arranged at spaced intervals around the drum parallel with its axis and extending through apertures in the plates and blocks to clamp them between end rings 51 in which the ends of the tie rods are anchored. By reason of the plurality of semi-circular pockets formed by the adjacent pairs of plates, the mass of beans, when fed into the drum, will pass into the feed pocket and will be wedged in mass-like formation therein. Due to the wedging action of the beans between the side plates, they will be carried upwardly in mass formation as the drum rotates, as shown by dotted arrows in FIG. 6. When they reach approximately the top of the drum, the beans will drop again to the bottom of the pocket. Due to the forward downward tilt of the drum, a percentage of the beans will drop into the next bean pocket. This is approximately one-third of the mass of beans. In this manner the beans will progress through the machine from inlet end to outlet end. As each mass of beans is carried upwardly in the bean pocket, the ends of the beans which project through the bean openings in the sections will come in contact with the diagonally arranged cutting edge of the first knife and will be snipped off. As the beans in the pocket travel past the first knife they will be in constantly shifting motion so that new bean ends will be presented to new portions of the slot, will project therethrough and will be snipped off by the succeeding knives of the series. In other words, the beans in the traveling pockets are in a constant state of individual shifting movement, but in general are carried in mass formation in a circular path of travel upwardly in order forwardly to feed the beans through the machine. As hereinbefore stated, the direct passage of any particular bean is prevented by the fact that the inner edges of the partitions or collars forming the bean pockets are out of registration.

It will be seen that with the knife blade arrangement above described, the contact pressure of each knife blade head 19 upon the surface of the drum 7 may be simultaneously regulated in accordance with the pressure in the pipe tubes 43. In addition, it will be seen that should a knife blade head 19 engage a hard foreign object, such as a nail, protruding from the drum 7, it will be pushed away from the surface of the drum, and in so doing the piston 48 will be caused to move inwardly, i.e., toward the tube 43. As soon as the foreign object passes the knife blade head 19, the blade will be moved into contact with the surface of the drum 7 by action of the pressure driven piston 48 causing counterclockwise movement of the blade assembly.

Thus, it will be apparent that the present invention satisfies the objectives set forth hereinbefore, namely, that uniform blade pressure is easily attained, that the contact pressure of all blades may be simultaneously varied, and that each blade will be moved from contact with the drum when a hard foreign object is engaged and will be automatically reset at the desired contact pressure when the foreign object passes the blade. In summation, it will be apparent that the present invention represents an improvement over similar bean snippers of the prior art.

The foregoing description has been given in detail without thought of limitation since the inventive principles involved are capable of assuming other physical embodiments without departing from the spirit of the invention and the scope of the appended claims.

What is claimed is:

1. In a string bean snipper having an inclined rotatable drum with curved openings through its peripheral wall arranged about the circumferential surface of the drum and through which the unsnipped ends of the beans project as the drum rotates, a plurality of knife blade assemblies, each of said assemblies including a knife blade head having at least one angularly disposed cutting edge arranged for sliding over predesignated curved openings, as the drum is rotated, a linkage system adapted for movement of the head toward and away from contact with the drum, a plurality of cylinders arranged externally of said drum, a piston in each cylinder engaging a corresponding linkage to urge a companion knife blade head into contact with the circumferential surface of said drum, and a pressure fluid supply means common to all of said pistons and uniformly biasing all of said pistons to urge said knife blades into contact with the circumferential surface of said drum.

2. In a string bean snipper having an inclined rotatable drum with curved openings through its peripheral wall arranged about the circumferential surface of the drum and through which the unsnipped ends of the beans project as the drum rotates, a pipe disposed adjacent the exterior of the drum and substantially parallel with the axis of the drum, a plurality of knife blade assemblies rotatably mounted upon the pipe, each of said assemblies including a knife blade head having at least one angularly disposed cutting edge arranged for sliding over predesignated curved openings as the drum is rotated, a linkage system adapted for movement of the head toward and away from contact with the drum, and a piston slidable within the pipe and responsive to pressure fluid therein for constantly urging the knife blade head into contact with the drum.

3. In a string bean snipper having an inclined rotatable drum with curved openings through its peripheral wall arranged about the circumferential surface of the drum and through which the unsnipped ends of the beans projected as the drum rotates, a pipe disposed adjacent the exterior of the drum and substantially parallel with the axis of the drum, a plurality of knife blade assemblies rotatably mounted upon the pipe, each of said assemblies including a knife blade head having at least one angularly disposed cutting edge arranged for sliding over predesignated curved openings as the drum is rotated, a linkage system adapted providing limited pivotal movement of the head relative to the pipe and being further adapted to permit movement of the head toward and away from contact with the drum, a flexible pressure fluid tube within the pipe, and a piston slidable within the pipe and in contact with the exterior surface of the tube and arranged in the linkage system so that the knife blade head may be constantly urged into contact with the drum.

4. In a string bean snipped having an inclined rotatable drum with curved openings through its peripheral wall arranged about the circumferential surface of the drum and through which the unsnipped ends of the beans project as the drum rotates, a plurality of pipes disposed adjacent the exterior of the drum and substantially parallel with the axis of the drum, a plurality of knife blade assemblies rotatably mounted upon each pipe so that the knife blade assemblies on one pipe are in staggered relation to the knife blade assemblies of an adjacent pipe, each of said knife blade assemblies including a knife blade head having at least one angularly disposed cutting edge arranged for sliding over predesignated curved openings as the drum is rotated, a linkage system adapted for providing limited pivotal movement of the head relative to the pipe and being further adapted to permit movement of the head toward and away from contact with the drum, a rubber tube within each pipe, means for connecting a common source of pressure fluid to each of said tubes, and a piston slidable within the pipe and in contact with the exterior surface of the tube and arranged in the linkage system so that the knife blade head may be constantly urged into contact with the drum.

5. In a string bean snipper according to claim 4, wherein the linkage system includes a rod connected to said head and having adjustment means for regulating the degree of contact pressure between the head and the drum.

6. In a string bean snipper according to claim 5, wherein a link is pivotally connected at one end to said rod and is pivotally connected at the other end to a bracket arranged for affixing the knife blade assembly to the pipe, said piston being arranged to engage the link to cause movement of the rod.

7. In a string bean snipper according to claim 6, wherein the linkage system includes a second rod which is pivotally connected at one end to the knife blade head and is pivotally connected at the other end to an arm of the bracket.

References Cited in the file of this patent

UNITED STATES PATENTS

| | | |
|---|---|---|
| 1,751,575 | Davidson et al. | Mar. 25, 1930 |
| 2,705,516 | Urschel | Apr. 5, 1955 |
| 2,841,818 | Griffith | July 8, 1958 |